United States Patent [19]

Anderson

[11] 4,036,749
[45] July 19, 1977

[54] PURIFICATION OF SALINE WATER

[76] Inventor: Donald R. Anderson, 3062 Blume Drive, Los Alamitos, Calif. 90720

[21] Appl. No.: 739,620

[22] Filed: Nov. 8, 1976

Related U.S. Application Data

[63] Continuation-in-part of Ser. No. 573,045, April 30, 1975, abandoned.

[51] Int. Cl.² .................... B01D 13/02; B01D 21/01; C02B 1/20
[52] U.S. Cl. ...................... 210/23 H; 210/45; 210/46; 210/47; 210/53; 210/259; 203/7
[58] Field of Search ............ 210/23 F, 23 H, 45, 210/46, 47, 49, 51, 52, 53, 56, 71, 72, 257 M, 259; 203/7

[56] References Cited

U.S. PATENT DOCUMENTS

| | | | |
|---|---|---|---|
| 2,703,748 | 3/1955 | Clarke | 210/49 |
| 2,735,779 | 2/1966 | Wenzelberger | 210/46 |
| 2,893,840 | 7/1959 | Vettel et al. | 210/259 |
| 2,934,419 | 4/1960 | Cook | 210/42 R |
| 3,262,877 | 7/1966 | Le Compte | 210/53 |
| 3,350,292 | 10/1967 | Weinberger | 210/53 |
| 3,463,814 | 8/1969 | Blanco | 203/7 |
| 3,574,077 | 4/1971 | Tsunoda | 203/7 |
| 3,627,479 | 12/1971 | Yee | 210/45 |
| 3,627,679 | 12/1971 | Fuller | 210/45 |
| 3,639,231 | 2/1971 | Bresler | 210/23 M |
| 3,676,067 | 7/1972 | Tabata | 203/7 |
| 3,725,267 | 4/1973 | Gelblum | 210/45 |
| 3,725,268 | 4/1973 | Gelblum | 210/53 |
| 3,833,464 | 9/1974 | Rolfe | 210/45 |
| 3,976,569 | 8/1976 | Sheppard | 210/23 F |

OTHER PUBLICATIONS

Topical Report, "Conceptual Design And Cost Estimates Of Lime-Magnesium-Carbonate Pretreatment Systems For Desalting Plants," U.S. Dept. of Interior, Office of Saline Water, Thermal Processes Division, Interim Topical Report No. 6, pp. 1-19.

*Primary Examiner*—Frank A. Spear, Jr.
*Assistant Examiner*—Ernest G. Therkorn

[57] ABSTRACT

There is disclosed a treatment of water that greatly reduces the scaling tendency of the water during its subsequent use or processing. The treatment comprises precipitation and separation of the calcium values of the water as calcium carbonate by the addition of magnesium hydroxide precipitant thereto, with, as needed, a carbonate source, e.g., carbon dioxide. During subsequent use or processing, salts dissolved in the water are concentrated in a residual portion thereof and the residual portion is processed by the addition of calcium hydroxide to precipitate the dissolved magnesium values from the residual portion and supply the magnesium hydroxide that is employed as the precipitant in the treatment of the raw water. The treatment can be applied to any of a variety of water treating processes such as reverse osmosis, distillation, electrodialysis, freezing, vapor compression, ion exchange, evaporative cooling and/or boiler feed water treatment. All of these processes are limited in efficiency and equipment design by the concentration of calcium salts in the residual water which rapidly approach their solubility limits as the water is concentrated, thereby inhibiting further concentration or forming of scale on the separation equipment during the salt concentration steps of the treating process. This invention greatly increases the operating efficiency of salt concentration processes by reading the tendency of the water to form scale during its processing.

10 Claims, 2 Drawing Figures

PURIFICATION OF SALINE WATER

REFERENCE TO RELATED APPLICATIONS

This application, is a continuation-in-part of my copending application, Ser. No. 573,045, filed on Apr. 30, 1975, now abandoned.

BACKGROUND OF THE INVENTION

1. Field of the Invention

This invention relates to any method wherein salts dissolved in a water supply are concentrated in a residual portion thereof, and, in particular, to a method for the pretreatment of the water supplied to a desalinization process and the brine produced therein in a fashion which greatly increases the operational efficiency of the desalinization method.

2. Brief Statement of the Prior Art

Expanding urban populations and the ever increasing reclamation of arid lands by irrigation have resulted in the maximum utilization of available waters in the arid and semi-arid areas of the country. Additionally, recognition of the right of subsequent users of surface waters, streams and the like to waters of undiminished quality has resulted in the necessity for the purification of various saline waters. Among such applications are the treatment of saline water recovered in the drains of irrigated lands to recondition this drain water for return to the water-shed, and the processing of industrial waste waters to reduce their impurities.

Various methods have been proposed for desalinization of saline water such as agricultural drain waters or industrial waste waters. Such treatments include distillation, reverse osmosis, electrodialysis, freezing, ion exchange and vapor compression which all effect separation of a purified water of greatly reduced salt content from a brine that is concentrated in the impurities present in the saline water. When the saline water is purified, the impurities in the brine rapidly reach their solubility limits at the treatment conditions and the brine becomes super-saturated. The super-saturated brine presents a number of difficulties in the purification treatment; it can cause the formation of scale on equipment such as the heating surfaces used in distillation, the heat exchange surfaces used for cooling of the water in freezing purifications, or the equipment surfaces used in vapor compression. Additionally, the efficiency of membrane processes such as reverse osmosis or electrodialysis is greatly reduced by scaling the membrane and precipitation formation in the brine channels of the equipment. In ion exchange water treatments, sulfuric acid is commonly used to regenerate spent cationic resins and the presence of calcium in the spent resin can result in the precipitation of calcium sulfate in the resin during its regeneration.

The practice followed to avoid operational difficulties caused by the limited solubility of the impurities, typically by the limiting solubility of calcium sulfate, is to limit the concentration of the brine in the purification process, thereby necessitating the treatment of substantially greater quantities of the saline water than is desirable.

In reverse osmosis units, agricultural drain water can only be concentrated about three-fold before the precipitates of calcium sulfate greatly scale the membrane and plug the equipment brine channels in the reverse osmosis unit. As a result, most reverse osmosis processes on saline waters require the discharging of approximately 25 percent of the water processed to waste facilities, thereby inhibiting the efficiency of the process and presenting a disposal problem of considerable magnitude.

Various techniques have been suggested for the pretreatment of saline water to improve the efficiency of their subsequent desalinization treatment. One method, described in U.S. Pat. No. 3,262,865, discloses that the deposition of scale in a water distillation process can be inhibited by acidifying the raw water with sulfuric acid. Another pretreatment method, disclosed in U.S. Pat. No. 3,639,231, comprises the ion exchange of the raw water prior to its desalinization treatment with reverse osmosis. A number of processes have also been developed for a chemical water softening of waters which contain hardness ions such as calcium and magnesium. Typically, these processes comprise the addition of calcium hydroxide alone or in combination with sodium carbonate to reduce the solubility of the dissolved calcium carbonate in the water. Typical of such treatments is that disclosed in U.S. pat. No. Pat. 3,740,330. These treatments, however, are not generally applicable to desalinization treatments because they do not sufficiently reduce the concentration of scale-forming dissolved salts in the processed water.

BRIEF DESCRIPTION OF THE INVENTION

This invention comprises a method for the pretreatment of water and is useful in combination with a subsequent processing involving concentration of the water such as a desalinization process, e.g., distillation, reverse osmosis, vapor compression, electrodialysis, freezing, ion exchange, etc., or use of the water in evaporative cooling or as boiler feedwater. The pretreatment method as applied to any of these processes results in a substantial decrease in the scale-depositing impurities of the water prior to the salt concentrating steps of the aforementioned water processes. The method also utilizes precipitants obtained in subsequent steps of the process and thereby is substantially self-sufficient in reagents.

Briefly, the method of the invention comprises the pretreatment of water prior to its use or subsequent treatment, e.g., desalinization, by the addition of a sufficient quantity of magnesium hydroxide and any necessary carbonate source, e.g., carbon dioxide, to the raw water to precipitate a substantial quantity of the dissolved calcium present therein as insoluble calcium carbonate. The calcium carbonate is recovered, converted to calcium hydroxide which is used as the reagent to treat the brine separated during the desalinization process and to recover magnesium hydroxide therefrom. The recovered magnesium hydroxide can then be employed as the precipitant for the precipitation of the calcium as insoluble calcium carbonate from the raw water.

While the presently preferred application of the pretreatment method of my invention is directed to the aforementioned desalinization of water, the invention has a greater applicability and is generally useful as a pretreatment in any process involving concentration of dissolved salts in a residual portion of water. Thus, it could be used to reduce the tendency of water to form scale deposits on cooling tower equipment used in evaporative cooling equipment or to reduce the tendency for the scale formation in blow down water from steam plants.

BRIEF DESCRIPTION OF THE DRAWINGS

The invention will be described with reference to the figures of which.

DESCRIPTION OF THE PREFERRED EMBODIMENTS

Figure 1:
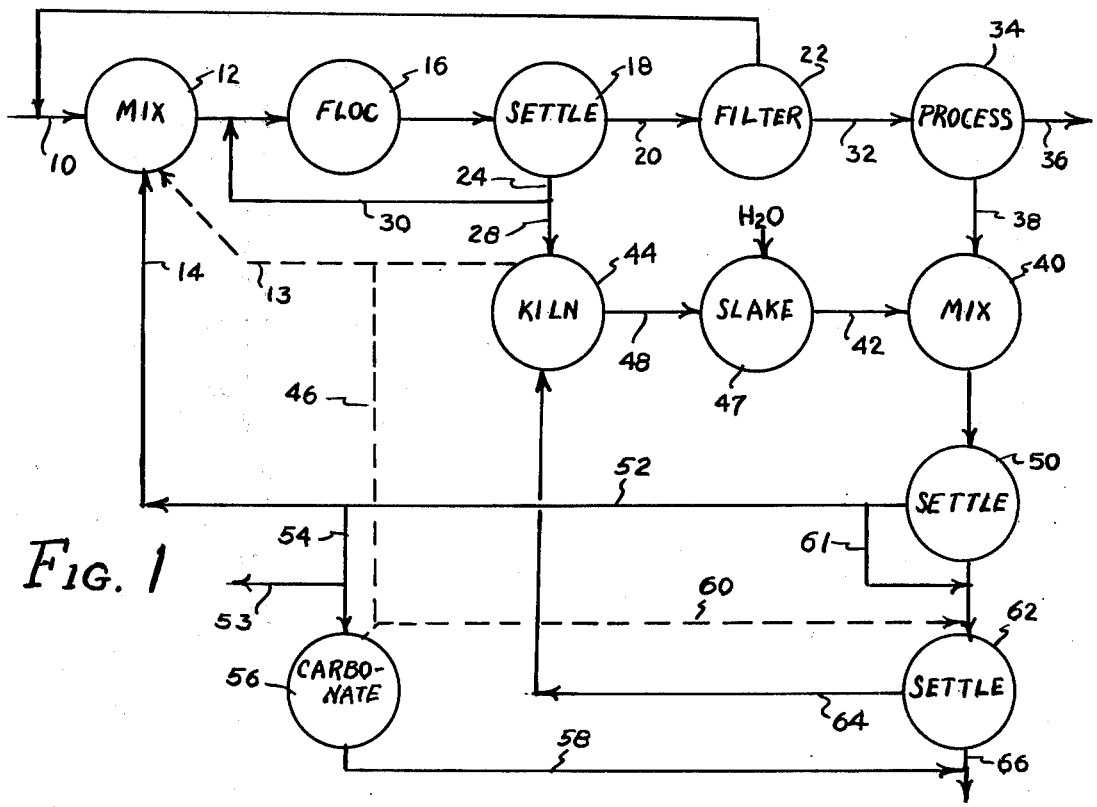
FIG. 1 illustrates a preferred application of the invention.

Referring now to FIG. 1, there is illustrated a flow diagram of a desalinization process utilizing the pretreatment method of this invention. In this application, the raw saline water enters the process at line 10. This water can be agricultural drain water, brackish water and the like, which generally has a dissolved salts content no greater than about 10,000 ppm. Waters which have greater salt contents and, in particular, sea water, which also has a disproportionally high magnesium content, can not be readily treated by this process because of high solubility activities and tendency of magnesium to complex calcium which greatly increase the solubility of calcium. It is also desirable that the sulfate content of the water be less than about 2500 ppm and, most preferably, less than about 1500 ppm to avoid excessive precipitation of calcium sulfate in the treated reject brine of the process. The inlet water can be screened and filtered, if necessary, to separate floating debris and suspended solids such as grit, sand and the like.

The water enters the first treatment step, generally indicated at 12 where it is contacted with a sufficient quantity of magnesium hydroxide, introduced through line 14, to precipitate a major quantity of the dissolved calcium in the saline water as insoluble calcium carbonate.

The calcium and/or bicarbonate contents of the raw water are adjusted to provide the proper proportions of calcium and bicarbonate that will insure substantially complete precipitation of calcium without such excess of bicarbonate that large amounts of acid are subsequently required to reduce the alkalinity of the treated water to render it fit for use or processing. The ratio of bicarbonate to calcium equivalents should, optimumly, be about 2/1 and this is the most preferred ratio, within the limits of acceptable process control, e.g., from about 1.05/1 to about 2.25/1, preferably from about 2/1 to 2.05/1.

If the water has an excess content of bicarbonate, calcium can be recycled to the first treatment step 12 from subsequent calcium recovery steps such as from the calcination step 44. A convenient source of calcium is the brine which is recycled with the magnesium hydroxide slurry through line 14. Typically, the concentration of magnesium hydroxide in the slurry can be varied from a low concentration to the maximum content that can be readily pumped, e.g., from about 0.02 to about 20 weight percent solids, with the actual concentration being determined by the amount of calcium and, hence, amount of brine, necessary to be recycled to supply any calcium imbalance in the bicarbonate to calcium ratio of the raw water. If necessary, some or all of the brine necessary to form the magnesium hydroxide slurry can be replaced with desalinized water by filtering and washing the magnesium hydroxide from the brine. This may be desirable to avoid recycling of impurities such as iron and maganese, etc., with the magnesium hydroxide.

When the raw water has insufficient bicarbonate alkalinity to furnish the aforementioned, required bicarbonate for the calcium precipitation, an additional carbonate source is added, e.g., an alkali metal or ammonium carbonate or bicarbonate, or, preferably, carbon dioxide. This carbon dioxide can be obtained from the process, e.g., from line 13.

The amount of magnesium hydroxide added to the water should be sufficient to raise the pH of the water to a value where calcium carbonate will precipitate. This pH for most water will be from about 8.5 to about 9.5, typically, about 9.0. The amount of magnesium hydroxide added will generally comprise from 0.05 to about 7.5 weight percent of the saline water and can conveniently be expressed on the percent of stoichiometric amount for conversion of the bicarbonate present to carbonate.

The degree of elimination of calcium from the water by its precipitation as calcium carbonate will depend, somewhat, on the nature of the subsequent use or treatment of the water as well as on the amount and content of other impurities in the water, and can be of any value from about 10 to about 80 percent of the calcium present. The amount of calcium removed is not directly proportional to the amount of magnesium hydroxide added as a percentage of stoichiometric requirement for bicarbonate conversion. Approximately 60 percent removal can be achieved by addition of about 30 percent stoichiometric quantities and about 80 percent removal can be achieved upon addition of about 90 percent stoichiometric quantities of magnesium hydroxide. Increasing the amount of magnesium hydroxide added above about 90 percent does not substantially increase the amount of calcium removal. Accordingly, removal of from 60 to about 80 percent of the calcium is preferred.

The admixture of magnesium hydroxide and saline water forms a precipitate of calcium carbonate. The resultant suspension is passed to a flocculation step 16 where it may be treated using minor amounts, e.g., from 0.01 to about 25 ppm of conventional flocculating agents such as organic polymers having long chain molecules, typically, polyacrylamide, to aid in the absorption of suspended materials to the flock.

The separation of the calcium carbonate is completed in step 18 where the treated water is processed using conventional equipment, such as settling vessels, precipitators, flotation devices and the like to separate the calcium carbonate flock from the water. Useful equipment for this treatment can be the conventional equipment in chemical water softening such as a sludge blanket precipitator or settler where the calcium carbonate sludge is accumulated and freshly treated water is passed upwardly through the precipitated material.

The effluent water removed through line 20 can then be passed to a suitable filtration step 22 where any entrained or suspended quantities of insoluble calcium carbonate are separated by filtration. Conventional filtration equipment can be employed such as filter thickneners which employ a plurality of fabric filter elements, or a layer of sand or other filtering materials. Back wash water from filtration step 22 can be returned through line 26 to blend with the incoming raw water in line 10.

The calcium carbonate separated from the water is removed from the settling step through line 24 and passed through line 28 to subsequent processing. Any desired portion of the separated calcium carbonate can be recycled through line 30 to the flocculation step 16 to facilitate the absorption process.

The water, which has its content of dissolved calcium carbonate reduced and, preferably, substantially eliminated, is passed through line 32 to the treating process step conducted at 34.

The formation of a brine in step 34 can be accomplished by any of a plurality of processes. A preferred process is reverse osmosis in which the water is pressured to about 200–1,000 p.s.i.g. and passed across a reverse osmosis membrane, typically formed of cellulose diacetate or polyamides, e.g., Nylon and related materials. These membranes are permeable to water but impermeable to dissolved salts. Under the applied pressure, osmosis occurs in the reverse direction, i.e., from the concentration saline water to a purified water on the opposite side of the membrane. Typically, treated water substantially reduced in salt content is produced through line 36 at a rate from 5 to about 20 gallons per square foot of membrane per day with power requirements of from 6 to 11 kilowatt hours per 1,000 gallons of deionized water. The membranes are supported against the applied pressure of the saline water by use of a plurality of configurations such as tubular liners, tubular wraps, spiral wound systems and hollow, fine fibers. Examples of these are spiral wound cellulose acetate membranes marketed by Gulf General Atomic and the hollow fibers of polyamides manufactured by E. I. DuPont de Nemours, Wilmington, Delaware.

Other desalinization processes that can be conducted include the distillation of the water using a single-stage, multiple-effect or flash distillation with evaporation temperatures from 200° to about 400° F. and pressures from atmospheric to subatmospheric, e.g., from about 0.01 to about 1 atmosphere. Various distillation equipment used in the evaporative distillation of saline water includes long tube vertical evaporators, wiped film evaporators, etc. In these processes, the saline water is heated, generally with a tubular heat exchanger, while flowing as a thin film over the surface of the tube bundle of the heat exchanger. In the single-stage and multiple-effect evaporation, the heat exchange is conducted while the brine is undergoing evaporation, while in flash distillation the saline water is preheated under pressure and then flashed into a low pressure evaporator. While the latter process affords the advantage of isolating the scale-forming liquid, i.e., the concentrated brine, from the heat exchange surfaces, the operation of the process is, nevertheless, limited by the scale-forming tendency of the liquid during evaporation.

Vapor compression distillation processes can also be used to effect the desalinization of the saline water. The vapor compression processes employ a tubular heat exchanger to preheat the saline water in indirect heat exchange with the exiting streams of brine and distilled water. The saline water boils in the tubes of the pressure still, the vapors are compressed and passed into the tubular heat exchanger, condensing therein to provide heat for the boiling of the saline water. In this technique, as in the single- and multiple-effect distillation, it is critical that the brine undergoing distillation not incur precipitation that could coat the surfaces of the heat exchange members with scale deposits and thereby reduce the heat transfer coefficients and greatly decrease the efficiency of the processes.

Other vapor compression processes use centrifical compression stills which employ a rapidly rotating, heat exchange surface on which the evaporating brine is distributed in a thin film. In this process, the saline water is introduced into a rotating conically shaped vessel, filed over the interior surface of the vessel and evaporated to release vapors which are passed into a compressor and the compressed vapors are passed into heat exchange with the external surface of rotating vessel, heating the vessel and condensing on its exterior surface. The brine is removed from the interior of the conical vessel and discharged from the process. In this technique it is also necessary to avoid precipitation in the liquid undergoing evaporation to insure that the heat exchange surfaces of the rotating conical vessel remain free of scale deposits and that a high rate of heat transfer exists between the condensing vapors outside, and the evaporating brine within, the vessel.

The desalinization process can also comprise electrodialysis. In this process, the saline water is pumped through a plurality of narrow compartments which are separated by alternate membranes which are permeable to cations or anions, respectively. The outer compartments bear electrode plates which are connected to a source of direct current voltage to pass a direct current through the assembly of compartments. The membranes and can be of heterogeneous composition comprising a permeable sheet material bearing a deposit of finely powdered, ion exchange resins or can be made entirely of polymeric ion exchange materials with suitable fiber reinforcement for the necessary mechanical strength. A common difficulty with this process is the formation of adherent scale deposits or coatings on the membranes which increase the flow and electrical resistance through the electrodialysis unit.

Another technique which can be employed for the desalinization process is freezing wherein the saline water is cooled to a freezing temperature to deposit ice crystals which are separated and melted to obtain purified water. The saline water can be cooled by direct freezing from the rapid evaporation of water from the saline water at subatmospheric pressures or indirect freezing from indirect heat exchange of the sale water with a refrigerant supplied by a refrigeration plant. Both processes result in the formation of brine containing ice crystals. The resultant slurry is passed to a separator where the ice is separated from the brine, washed and subsequently melted in heat exchangers to obtain purified water. In these processes it is necessary to avoid the formation of precipitates of impurities in the water since such precipitates will contaminate the separated ice crystals and the water recovered upon their melting. The brine from the process is also passed through heat exchangers to cool the water under treatment and these heat-exchange surfaces are subject to scaling.

Referring again to FIG. 1, the rejected brine from the process, regardless of the nature of the desalinization process conducted in step 34, is removed through line 38 and is subsequently treated in accordance with the invention. This brine is passed into mixing zone 40 where it is contacted with a supply of calcium hydroxide through line 42. The calcium hydroxide used in the process is, preferably, obtained from the calcium carbonate sludge passing through line 28. The produced calcium carbonate is introduced through line 28 into a furnace or kiln in a calcination step 42 where it is heated to a high temperature, above its decomposition temperature of 825° C, preferably, between about 850° and 1200° C. sufficient to decompose the calcium carbonate and release carbon dioxide through line 46. The resultant, powdered calcium oxide is removed from the calcination step 44 through line 48 and passed into admixture with sufficient water to slake the calcium oxide in step 47 and produce calcium hydroxide which is supplied to the mixing step 40 through line 42.

A sufficient quantity of calcium hydroxide is introduced through line 42 to precipitate the magnesium hydroxide from the brine obtained in line 38, typically at a pH from 10 to about 11, preferably, about 10.5. While the amount of calcium hydroxide required will depend on the composition and concentration of impurities in the brine, it will generally be from 2 to about 15 weight percent of the brine. The resultant precipitate of magnesium hydroxide is separated from the brine in settling step 50 and is removed from the settling tank through line 52 to supply the requirements of magnesium hydroxide of line 14 used in the initial precipitation of the calcium carbonate from the saline water. This treatment also causes formation of insoluble calcium sulfate in an amount dependent on the sulfate content of the brine. I have found that the calcium sulfate precipitates much more slowly than does the magnesium hydroxide so that the latter can be separated free of calcium sulfate if it is separated from the brine immediately after its precipitation, e.g., within a period from a few minutes to eight hours, preferably 15 minutes to five hours following the addition of calcium hydroxide. The treated brine can be discharged to settling vessles, ponds and the like having a sufficient residence time to permit the calcium sulfate to precipitate and settle.

In the preferred embodiment illustrated in FIG. 1, it is desirable to return all of the calcium separated from the water in the pretreatment step to the brine exiting the process. The addition of this quantity of calcium as calcium hydroxide to the brine may, however, result in the precipitation of a greater quantity of magnesium hydroxide than necessary to effect the calcium carbonate precipitation in the saline water. The excess magnesium hydroxide is passed through line 54 to a carbonation step 56. The carbon dioxide liberated by the calcination of the calcium carbonate can be passed through line 46 to supply the carbon dioxide for carbonation step 56 and through line 13 to supply carbonates, if needed, for precipitation of calcium carbonate from the raw water. In addition, some or all of the combustion gas products from the burning of the fuel used for the calcination of the calcium carbonate can be supplied as a source of carbon dioxide to complete the carbonation in step 56. This carbonation is conducted sufficiently to convert the magnesium hydroxide to magnesium bicarbonate which can be withdrawn in a slurry or suspension through line 58 and redissolved in the brine which exits the process through line 66. Alternatively, the excess magnesium hydroxide can be returned directly to the brine through line 61 or, if desired, could be suspended in the brine from settling step 50 after removal, in step 50, of sufficient magnesium hydroxide for the calcium precipitation. All or a portion of the excess quantity of magnesium separated in settling step 50 can, alternatively, be removed through line 53 as a useful by-product of the process and can be subsequently processed, e.g., reduced to the metal or converted to a valuable, commercial magnesium compound such as magnesium oxide, a valuable raw material for refractory manufacture.

The clarified brine, after separation of the magnesium hydroxide, or the succeeding separation of calcium sulfate can be further treated to reduce its pH to a neutral level, e.g., about 7-8 by the addition of carbon dioxide through line 60. This neutralization will result in some precipitation of calcium carbonate which can be settled from the brine in settling step 62 and returned to calcination step 44 through line 64 and will form magnesium bicarbonate from any magnesium present in the brine.

Figure 2:
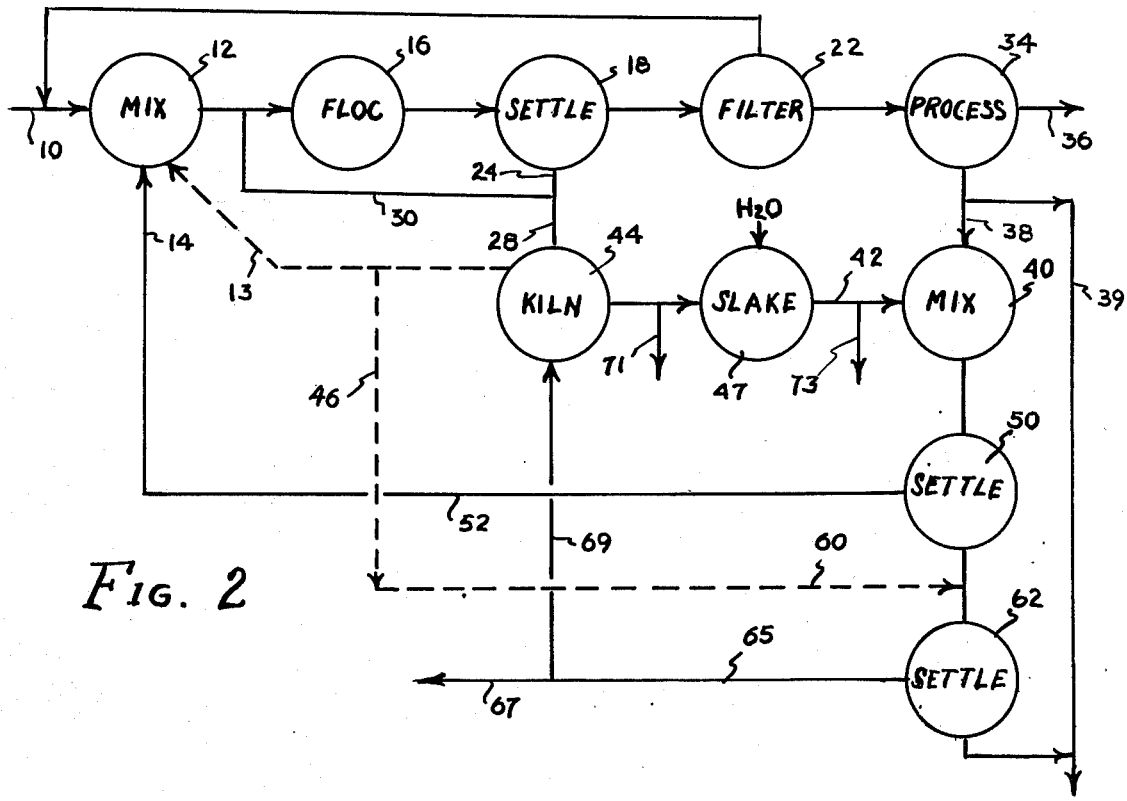
FIG. 2 illustrates another embodiment of the invention.

Referring now to FIG. 2, a modification of the process is disclosed which has a substantially identical pretreatment of the raw saline water prior to the purification process in step 34. Accordingly, the description of the process in the pretreatment of the saline water is not repeated herein and FIG. 2 illustrates the process with identical numerals to identify identical portions of the processes of FIGS. 1 and 2.

The process of FIG. 2 differs from that of FIG. 1 in the treatment of the brine removed through line 38 from the desalinization step 34. As illustrated in FIG. 2, a portion of the brine is diverted and passed to disposal without further treatment through line 39. The remainder of the brine is passed through line 38 to mixing zone 40 where it is treated with calcium hydroxide introduced through line 42 from the slaking step 47. The amount of calcium hydroxide added to the separated portion of the brine in the mixing zone 40 is sufficient to precipitate substantially all of the magnesium values in this brine at the aforedescribed pH values. The magnesium separated as magnesium hydroxide in settling step 50 is passed, through line 52, to step 12, to supply the magnesium hydroxide required for precipitation of the calcium in the entering raw saline water.

Carbon dioxide, which can be recovered from the calcination of the calcium carbonate and/or the combustion gases formed by burning of fuel in step 44, can be passed through line 60 into contact with the treated brine from the magnesium hydroxide separation zone 50 to lower its pH value to acceptable, near-neutral values of from 7 to about 8. The neutralization of this brine results in the precipitation of a substantial quantity of calcium carbonate that is removed through line 65. All or a portion of the separated calcium carbonate can be disposed as a waste product or recovered as a useful by-product of the process through line 67. Alternatively, the calcium carbonate can be passed through line 69 to the calcination step 44 to obtain calcium oxide therefrom which could be a useful product, e.g, for Portland cement manufacture and the like, and removed through line 71. Alternatively, all or most of the calcium oxide produced in the step 44 could be passed to the slaking step 47 and converted into calcium hydroxide with the excess calcium being removed from the process through line 73 as calcium hydroxide, should the latter be a useful or desirable by-product of the process.

The following examples will illustrate the practice of the invention and demonstrate results obtainable thereby.

EXAMPLE I

In this example, saline water is treated which is characteristic of agricultural drain waters and which has the following composition of dissolved salts, expressed in milliequivalents per liter (meq/l):

| COMPONENT | CONCENTRATION |
|---|---|
| Calcium | 11.0 meq/l |
| Magnesium | 6.0 |
| Sodium | 30.1 |

| COMPONENT | CONCENTRATION |
|---|---|
| Bicarbonate | 6.2 |
| Sulfate | 17.0 |
| Chloride | 23.9 |

A sample of the aforedescribed water is treated to precipitate calcium carbonate therefrom by the addition, to one liter water, of 1.4 milliequivalent of calcium and associated anions along with 6.2 milliequivalents of magnesium hydroxide. The addition of the magnesium hydroxide raises the pH value of the water to approximately 9.0 and a white flocculant precipitate of calcium carbonate is formed. The precipitate is flocculated and separated by settling and filtration to remove 12.1 milliequivalents of calcium carbonate, resulting in a clear effluent having the following composition:

| COMPONENT | CONCENTRATION |
|---|---|
| Calcium | 0.3 meq/l |
| Magnesium | 12.2 |
| Sodium | 32.5 |
| Sulfate | 18.4 |
| Chloride | 25.2 |
| Carbonate | 0.3 |

Sufficient sulfuric acid is added to the treated water to reduce its pH level to 6.0 and the water is processed through a reverse osmosis treatment to recover a purified and substantially deionized water therefrom which comprises approximately 90 percent of the raw saline water to the treatment. The salt rejection efficiency of the reverse osmosis treatment is about 94 percent. The rejected brine from the reverse osmosis treatment comprises 10 percent of the saline water to the treatment and this brine has the following composition:

| COMPONENT | CONCENTRATION |
|---|---|
| Calcium | 3.0 meq/l |
| Magnesium | 111.0 |
| Sodium | 303.0 |
| Sulfate | 176.0 |
| Chloride | 237.0 |
| Bicarbonate | 3.0 |

An adequate portion of the aforementioned brine is treated by the addition to each liter of brine, of 120 milliequivalents of calcium hydroxide which is sufficient to raise the pH of the brine to 10.6 and to form a gelatinous precipitate of magnesium hydroxide in an amount comprising 110 milliequivalents of magnesium from each liter of the brine, resulting in the production of a treated brine of the following composition:

| COMPONENT | CONCENTRATION |
|---|---|
| Calcium | 123.0 meq/l |
| Sodium | 303.0 |
| Magnesium | 1.0 |
| Sulfate | 176.0 |
| Chloride | 237.0 |
| Hydroxide | 14.0 |

The quantity of magnesium hydroxide which is settled from the water is more than sufficient for the requirements of the magnesium hydroxide utilized in the first step of the treatment, which was the addition of 6.2 milliequivalents magnesium hydroxide per liter raw saline water entering the treatment.

The treated brine can, thereafter, be carbonated by contacting carbon dioxide therewith to reduce its pH to an acceptable, near-neutral level, e.g., from 7 to about 8. The addition of the carbon dioxide to the brine results in additional precipitation of calcium carbonate which is permitted to settle and is removed from the process in an amount comprising 14 milliequivalents per liter of brine. The calcium carbonate recovered in this step can be combined with that separated from the raw saline water in the initial pretreatment and calcined at a temperature of about 850° C. to prepare calcium oxide therefrom. This calcium oxide can be slaked to produce all of the requirements of the calcium hydroxide utilized in the process.

EXAMPLE II

This example illustrates that the precipitation of magnesium hydroxide is sufficiently rapid to permit its separation from a calcium sulfate containing brine. In this experiment, a brine was prepared having a composition of dissolved salts as would be obtained from a reverse osmosis process practiced on typical agricultural drain water in which 15 percent of the raw water is rejected as residual brine. This brine was prepared by dissolving salts in distilled water to obtain a brine of the composition indicated in the following table:

| COMPONENT | CONCENTRATION |
|---|---|
| Sodium | 6267 parts per million |
| Calcium | 110 |
| Magnesium | 1180 |
| Potassium | 53 |
| Chloride | 8133 |
| Sulfate | 7200 |

The testing was conducted by placing 7 liters of the brine in a treatment vessel 5.44 inches in diameter. The vessel had a sampling tap located approximately 6 inches from its bottom and on its centerline. Calcium hydroxide in an amount comprising 3.85 grams per liter of brine was added to the vessel contents and resultant mixture was stirred for five minutes. The addition of the calcium hydroxide resulted in the immediate formation of a white flocculant precipitate that slowly settled in the vessel, leaving a clear supernatant layer of brine. The amount of calcium added comprised 110 percent of the stoichiometric quantity necessary for reaction with the magnesium present in the brine. Periodic samples of the brine were withdrawn through the sampling line and samples were also taken of the clear supernatant layer over a three hour period following the addition of calcium hydroxide. The samples were stored for four days and therafter analyzed. At the time of analysis it was observed that all the samples, including those taken from the supernatant layer contained a crystaline precipitate and that the samples withdrawn from the submersed sample tap also contained the white flocculant precipitate. Prior to analysis the samples were treated to redissolve all precipitates and this treatment comprised the three-fold dilution of the sample with distilled water acidification with hydrochloric acid to a pH of approximately 1 and heating to boiling and cooling. In the analysis, 10 milliliter aliquote portions of each sample were subjected to a standard wet titration analysis. The results of the analysis revealed that there was no significant difference in calcium content between the samples withdrawn from the clear, supernatant layer and the samples withdrawn from the lower sample tap of the vessel, thereby indicating that the calcium sulfate had not coprecipitated during the three hour sampling period.

The aforedescribed experiments demonstrated that the addition of calcium hydroxide to a typical brine rejected from a desalinization treatment of agricultural drain waters will result in selective precipitation of the magnesium hydroxide. Calcium sulfate very slowly forms as a coprecipitant whereas the formation of the insoluble magnesium hydroxide occurs substantially instantaneously upon the addition of the calcium hydroxide. The retarded precipitation of the calcium sulfate thereby permits selective precipitation and recovery of the magnesium hydroxide from the brine.

EXAMPLE III

A process raw agricultural drain water taken from near Yuma, Arizona was treated in this experiment. The water had the following composition:

| COMPONENT | CONCENTRATION |
|---|---|
| Calcium | 258 meq/l |
| Magnesium | 98 |
| Sodium | 952 |
| Potassium | 9 |
| Bicarbonate | 522 |
| Sulfate | 940 |
| Chloride | 1220 |

The conversion of the bicarbonate to carbonate requires a stoichiometric addition of 251 meq./l. of magnesium hydroxide. The resultant removal of 75 percent of calcium as calcium carbonate produces a treated water of the following composition:

| COMPONENT | CONCENTRATION |
|---|---|
| Calcium | 65 meq/l |
| Magnesium | 198 |
| Sodium | 952 |
| Potassium | 8 |
| Sulfate | 1282 |
| Chloride | 1220 |

The reject brine produced in a desalinization process rejecting 15 percent of the feed water as brine has the following composition:

| COMPONENT | CONCENTRATION |
|---|---|
| Calcium | 433 meq/l |
| Magnesium | 1320 |
| Sodium | 6347 |
| Potassium | 53 |
| Sulfate | 8546 |
| Chloride | 8133 |

A brine of the above composition was treated by addition of calcium hydroxide at a concentration of 4400 meg/1. (110 percent stoichiometric). The mixture was permitted to settle and a sludge was separated after two hours of settling. Analysis of the sludge revealed magnesium and calcium present at 6366 and 2600 meq/l., respectively.

The resultant sludge was used to treat a series of 500 ml samples of raw water of the composition previously set forth. Settling of the resultant calcium carbonate was promoted by the addition of 5 grams calcium carbonate. The amount of sludge added (as a percent of the stoichiometric quantity for bicarbonate conversion), the water pH value, calcium content and percent calcium removal are expressed in the following table:

| Sample No. | $Mg(OH)_2$ Percent of Stoich. | Water pH | Calcium* meq/l | Percent Ca Removed |
|---|---|---|---|---|
| 1 | 0 | 7.2 | 232 | 10 |
| 2 | 20 | 8.1 | 130 | 50 |
| 3 | 30 | 8.3 | 103 | 60 |
| 4 | 40 | 8.25 | 91 | 65 |
| 5 | 70 | 8.35 | 85 | 67 |
| 6 | 90 | 8.5 | 59 | 77 |
| 7 | 100 | 8.6 | 57 | 78 |
| 8 | 120 | 8.7 | 57 | 78 |
| 9 | 140 | 8.7 | 60 | 77 |

*After one hour of settling

EXAMPLE IV

The following will illustrate the application of the process to a treatment plant capable of processing 110 million gallons of saline water per day. The saline water can be initially treated with an oxidant such as an alkali metal permanganate to oxidize dissolved ferrous ions to the ferric ions, decreasing their solubility and precipitating ferric salts from the saline water. The water is then passed into a mixing zone and is contacted therein with magnesium hydroxide supplied thereto at a rate of 75.2 tons per day, resulting in the formation of a flocculant precipitate which is separated in the succeeding flocculation and settling stages as insoluble calcium carbonate in a quantity comprising 251 tons per day. The water is acidified by the addition of sulfuric acid to reduce its pH to an acceptable treatment level, typically to a value of 6.0. The treated water is thereafter passed through a reverse osmosis process to produce deionized water at a rate of 10 million gallons per day and a concentrated brine at the rate of 10 million gallons per day.

The calcium carbonate separated from the pretreatment step and recovered in subsequent brine processing is passed to a kiln and is burnt therein at a temperature of about 925° C. to decompose the carbonate and produce 223 tons per day of calcium oxide which is slaked by the addition of water to produce 334 tons per day of calcium hydroxide. The calcium hydroxide is added to the brine separated from the reverse osmosis treatment resulting in the precipitation of 187 tons per day of magnesium hydroxide which is separated from the brine. Half of the magnesium hydroxide so separated, 93.5 tons per day, is used as the magnesium precipitant in the pretreatment of the saline water and the balance of the magnesium hydroxide is passed into a carbonation zone where it is converted to magnesium bicarbonate by contacting with carbon dioxide while suspended in an aqueous medium.

The brine produced after the separation of the magnesium hydroxide is neutralized by bubbling carbon dioxide into contact therewith to reduce its pH value to about 7.5, resulting in the precipitation of 137 tons per day of calcium carbonate that is separated from the brine and passed to the kiln for calcination as the supply of calcium hydroxide to the process.

The excess magnesium bicarbonate, in the form of a concentrated solution of magnesium bicarbonate, is thereafter added to the brine produced after separation of the calcium carbonate to prepare a highly concentrated brine that can be discharged from the process.

The invention has been described with reference to the presently preferred and illustrated embodiment thereof. It is not intended that the invention be unduly limited by the illustrated and preferred embodiments. Instead, it is intended that the invention be defined by the method steps and their obvious equivalents set forth in the following claims.

What is claimed is:

1. A method for selectively removing calcium salts from raw water containing dissolved salts, including calcium bicarbonate, in a total amount no greater than about 10,000 parts per million, and for purifying the water wherein said dissolved salts in said raw water are concentrated in a residual portion during said purification thereof to a content approaching their solubility limits at the purification processing conditions, which comprises the following sequential steps for reducing the volume of said residual portion:
   a. adding magnesium hydroxide precipitant to the raw water in an amount sufficient to precipitate calcium carbonate settling said precipitate, and recovering a treated water having a substantially reduced dissolved calcium content that said raw water and passing said treated water to said processing;
   b. processing said treated water to separate a purified water from a residual water enriched with salts by reverse osmosis, distillation, electrodiaylsis or freezing;
   c. adding calcium hydroxide to at least a portion of the residual water from said processing in an amount sufficient to precipitate soluble magnesium values in said waste brine as insoluble magnesium hydroxide; and
   d. separating magnesium as magnesium hydroxide from said waste brine and returning the separated magnesium hydroxide as substantially the entirity of the precipitant to step (a).

2. The method of claim 1 wherein a carbonate source selected from the class consisting of an alkali metal and ammonium carbonate and carbon dioxide is also added to the water.

3. The method of claim 2 wherein said carbonate source is carbon dioxide.

4. The method of claim 1 wherein the calcium hydroxide used in step (b) is obtained by calcining the calcium carbonate precipitated in step (a).

5. The method of claim 4 wherein said calcining is performed by heating said calcium carbonate to a temperature of at least 825° C.

6. The method of claim 1 wherein said processing comprises the forcing of said treated water through a reverse osmosis membrane to obtain a purified effluent and to concentrate dissolved salts contained in said treated water in said residual portion.

7. The method of claim 1 wherein said processing comprises the distillation of said treated water to obtain a purified distillate and a residue concentrated in dissolved salts contained in said treated water and separating said residue as said waste brine.

8. The method of claim 1 wherein said processing comprises the electrodialysis of said treated water to obtain a purified effluent and a rejected brine concentrated in dissolved salts contained in said saline water.

9. The method of claim 1 wherein said processing comprises freezing of said treated water to obtain ice crystals purified of salts and a brine concentrated in dissolved salts contained in said water and separating said ice crystals from said brine.

10. The method of claim 1 wherein said processing comprises distillation of said treated water into a purified vapor and a brine residue, compressing the purified vapor, condensing the vapor and utilizing the heat of condensation for vaporization of the treated water.

* * * * *